US008041101B2

(12) United States Patent
Okamoto et al.

(10) Patent No.: US 8,041,101 B2
(45) Date of Patent: Oct. 18, 2011

(54) IMAGE PROCESSING SYSTEM AND IMAGE FORMING APPARATUS

(75) Inventors: Yuji Okamoto, Kyoto (JP); Naofumi Ueda, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 609 days.

(21) Appl. No.: 12/232,635

(22) Filed: Sep. 22, 2008

(65) Prior Publication Data

US 2009/0099889 A1 Apr. 16, 2009

(30) Foreign Application Priority Data

Oct. 16, 2007 (JP) ................................ 2007-268968

(51) Int. Cl.
*G06Q 10/00* (2006.01)

(52) U.S. Cl. ....... 382/141; 382/118; 382/187; 340/5.67; 340/5.83

(58) Field of Classification Search .................. 382/118, 382/141, 187, 305, 232; 715/848, 854; 340/5.23, 340/5.67, 5.7, 518, 542, 650
See application file for complete search history.

(56) References Cited

U.S. PATENT DOCUMENTS

| | | | | |
|---|---|---|---|---|
| 3,786,471 | A * | 1/1974 | Hochman et al. | 340/5.23 |
| 6,819,218 | B2 | 11/2004 | Mabuchi et al. | |
| 7,006,672 | B2 * | 2/2006 | Sato et al. | 382/118 |
| 7,454,041 | B2 * | 11/2008 | Sukegawa et al. | 382/118 |
| 7,460,692 | B2 * | 12/2008 | Mizutani et al. | 382/118 |
| 7,639,846 | B2 * | 12/2009 | Yoda | 382/118 |
| 2002/0191817 | A1 * | 12/2002 | Sato et al. | 382/118 |
| 2007/0091351 | A1 * | 4/2007 | Okamoto et al. | 358/1.14 |
| 2009/0037716 | A1 * | 2/2009 | Okamoto et al. | 713/1 |
| 2009/0189870 | A1 * | 7/2009 | Ueda et al. | 345/173 |

FOREIGN PATENT DOCUMENTS

| | | |
|---|---|---|
| JP | 04-017457 | 1/1992 |
| JP | 11-202929 | 7/1999 |
| JP | 2004-086316 | 3/2004 |
| JP | 2006-222741 | 8/2006 |
| JP | 2007-034590 | 2/2007 |

* cited by examiner

*Primary Examiner* — Hoa Pham

(74) *Attorney, Agent, or Firm* — David G. Conlin; Steven M. Jensen; Edwards Angell Palmer & Dodge LLP

(57) ABSTRACT

When a predetermined anomaly has occurred in a digital multifunctional machine, the fact of the anomaly occurring is notified to the service center and the computer at the guardhouse. The service person sent out from the service center is issued with an entrance permit from the entrance permit issuing device at the guardhouse. Then, the service person can pass through the passage gates in the building using the information recorded in the entrance permit and reach the place where the digital multifunctional machine is installed.

8 Claims, 8 Drawing Sheets

700
1
Service center
650
Building
Guardhouse
500
600

1
Controller
100
Image reader
102
Control portion
104
Image forming portion
106
Modem unit
108
Image memory
110
Communicator
112
ROM
Image forming program
114
1142
Management portion
116
Storage
118
Trouble log information area
1182
Entrance permit information area
1184
N3
N1
400
200
300

*FIG. 6*

| Date and time of occurrence | Trouble type |
|---|---|
| 2007/09/30 12 : 34 : 50 | Toner end |
| 2007/09/30 17 : 15 : 12 | Abnormal temperature in the fixing unit |
| ⋮ | ⋮ |

*FIG. 7*

| Entrance permit ID | Passage gates | Person in charge | Date and time of maintenance |
|---|---|---|---|
| A001 | A-B-F-G-14 | Mr. A | 2007/09/30 19:00:00 |
| ⋮ | ⋮ | ⋮ | ⋮ |

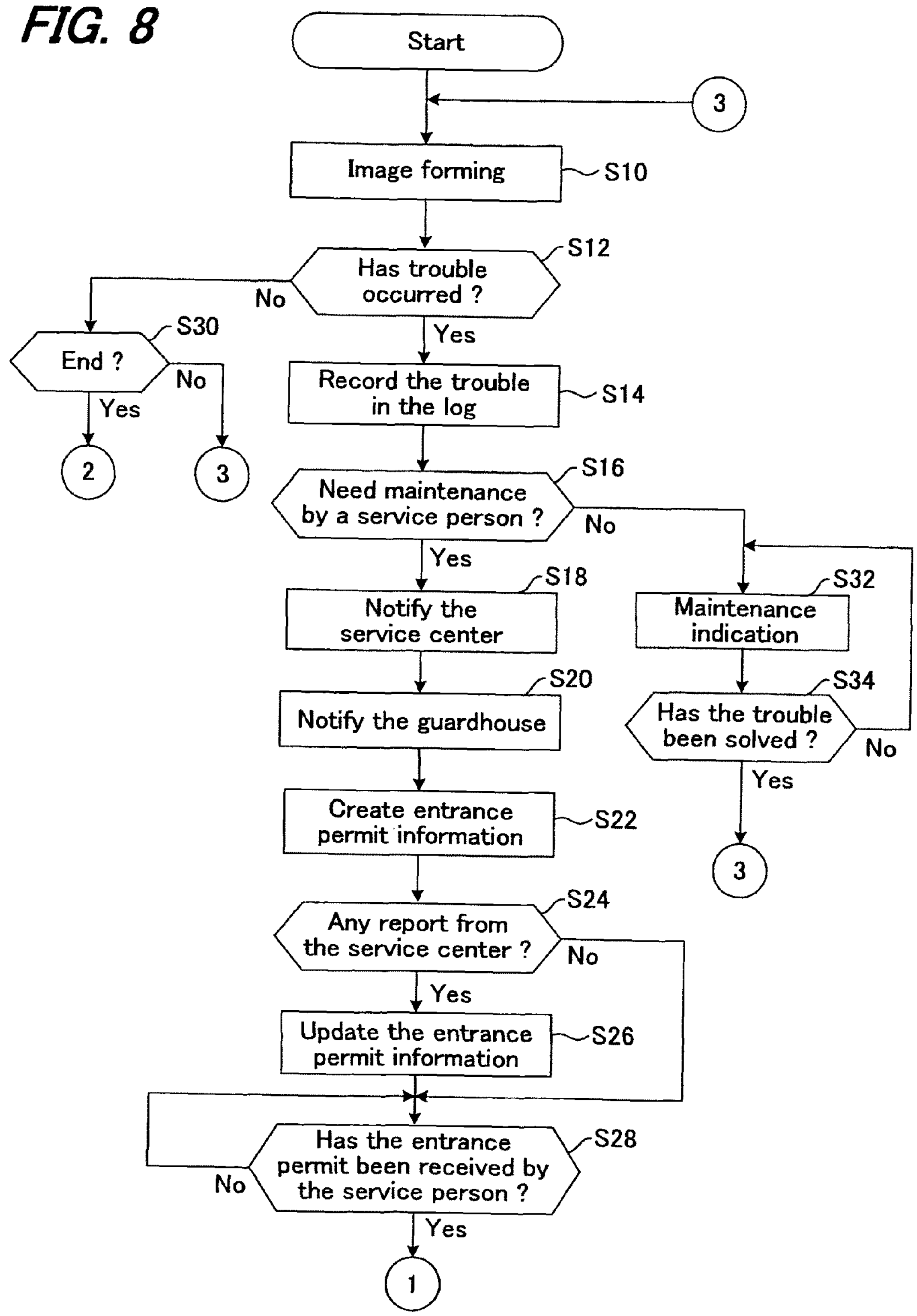
FIG. 8
Start
3
Image forming
S10
Has trouble occurred ?
S12
No
Yes
End ?
S30
No
Yes
2
3
Record the trouble in the log
S14
Need maintenance by a service person ?
S16
No
Yes
Notify the service center
S18
Maintenance indication
S32
Notify the guardhouse
S20
Has the trouble been solved ?
S34
No
Yes
3
Create entrance permit information
S22
Any report from the service center ?
S24
No
Yes
Update the entrance permit information
S26
Has the entrance permit been received by the service person ?
S28
No
Yes
1

IMAGE PROCESSING SYSTEM AND IMAGE FORMING APPARATUS

This Nonprovisional application claims priority under 35 U.S.C. §119 (a) on Patent Application No. 2007-268968 filed in Japan on 16 Oct. 2007, the entire contents of which are hereby incorporated by reference.

BACKGROUND OF THE INVENTION (1) Field of the Invention

The present invention relates to an image processing system including an issuing terminal for issuing entrance permits, a service center and an image forming apparatus connected to the image issuing terminal and the service center.

(2) Description of the Prior Art

Recently, digital multifunctional machines having scanner, facsimile and other functions in addition to the copier function have been known. During usage of a digital multifunctional machine, various kinds of anomaly conditions (errors) may occur. Examples of such errors include so-called paper jam or recording sheets becoming jammed inside the machine, toner end, and others.

At such cases, the digital multifunctional machine notifies the user of the occurrence of the anomaly condition. The user takes measures depending on the type of the error indicated to restore the digital multifunctional machine into the functional state.

However, there are cases the user cannot deal with, depending on the types of anomaly conditions. For example, a condition in which it becomes impossible to perform printing to the recording paper due to abnormal increase in the temperature of the fixing unit and another condition in which it become impossible to perform image reading due to malfunction of the CCD (charge coupled device) sensor inside the digital multifunctional machine apply to this case.

In general, when an anomaly condition that the user cannot handle has occurred, the user makes contact (a so-called service call) with the service center. After receiving a service call, the service center sends an engineer (service person) to the place where the digital multifunctional machine is installed to repair the machine.

Here, in companies and the like, it is a usual practice that all the people who enter or leave the company compound are checked and managed for security reasons. In general, an entrance management section such as a guardhouse or the like is placed at the entrance of the building or compound. When a visitor gives the destination of the visit, visit purpose and the like at the entrance management section, the visitor is issued with an entrance permit so as to be able to enter the building or compound.

Concerning such entrance management, there have been known technologies to control the visitors in a centralized manner using computers (e.g., see patent documents 1, 2 and 3 below).

Patent document 1:

Japanese Patent Application Laid-open 2006-222741

Patent document 2:

Japanese Patent Application Laid-open 2004-86316

Patent document 3:

Japanese Patent Application Laid-open Hei 11-202929.

When a service person visits a company etc., to repair a digital multifunctional machine as stated above, he/she visits the entrance management section such as guardhouse first, and gives his/her identity, the destination of the visit, visit purpose, etc. The entrance management section checks whether the service person has been scheduled to visit, and creates an entrance permit if he/she has been scheduled to come and gives the permit to him/her.

On the other hand, when the user of the digital multifunctional machine did not notify the entrance management section of the visit of the service person, the entrance management section makes an inquiry about the visiting service person to the user.

Then, the service person goes to the place where the digital multifunctional machine is installed based on the entrance permit, and then after completion of maintenance work, he/she needs to return to the entrance management section to report his/her leaving.

In the above way, if a service person visits a company in order to carry out the maintenance of a digital multifunctional machine, complex procedures need to be done until he/she obtains the entrance permit. Accordingly, there has been the problem that the service person cannot start maintenance work smoothly and promptly.

In particular, when the entrance management section has not been notified after a machine malfunction occurred, it could sometimes take a long time to obtain confirmation, hence a further time would be needed to start the maintenance work. Further, there occurs a time lag from the occurrence of a machine malfunction to when the service center and entrance management section receive its report. For these reasons, there has been the problem that the state of malfunction of the digital multifunctional machine becomes longer and the working ratio of the machine is lowered.

SUMMARY OF THE INVENTION

In view of the above problems, it is therefore an object of the present invention to provide an image processing system and the like which, when an anomaly occurred in an image forming apparatus, enables rapid restoration from the anomaly in the image forming apparatus by automatically informing the malfunction to a service center and an entrance permit issuing device.

In view of the above problems, an image processing system of the present invention includes an issuing terminal for issuing entrance permits, a service center and an image forming apparatus connected to the image issuing terminal and the service center, and is characterized in that the image forming apparatus includes: an anomaly status detector for detecting an anomaly condition of the image forming apparatus; an anomaly type determining portion for determining the type of the anomaly condition detected by the anomaly status detector; a service center-notifying portion for notifying the service center of the anomaly condition when the type of the anomaly determined by the anomaly type determining portion is of a predetermined anomaly type; and, an issuing terminal-notifying portion for notifying the issuing terminal of the anomaly condition when being notified of occurrence of the anomaly condition by the service center-notifying portion.

In the above image processing system, the issuing terminal may include an entrance permit issuing portion for issuing an entrance permit when being notified by the issuing terminal notifying portion that the image forming apparatus is in the anomaly condition.

In the above image processing system, the issuing terminal-notifying portion may notify the passage permit information for permitting passage to the place where the image forming apparatus is installed in addition to the anomaly condition; and the entrance permit issuing portion may record the passage permit information that the issuing terminal notifying portion has notified of to issue the entrance permit.

In the above image processing system, the service center may transmit maintenance information to the image forming apparatus when the service center has received a notice that the image forming apparatus is in the anomaly condition.

The above image processing system is connected to a management device for managing a service person, the management device may include a location detector for detecting the location of the service person.

In the above image processing system, the location detector may also detect the time when the location of the service person is detected.

In the above image processing system, an identification information to identify the image forming apparatus is recorded in the entrance permit, and the image forming apparatus may include an entrance permit recognition portion for recognising the entrance permit, and moves into a maintenance mode when the identification information is recorded in the entrance permit recognised by the entrance permit recognition portion.

An image processing apparatus connected to an issuing terminal for issuing entrance permits and to a service center, includes: an anomaly status detector for detecting an anomaly condition of the image forming apparatus; an anomaly type determining portion for determining the type of the anomaly condition detected by the anomaly status detector; a service center-notifying portion for notifying the service center of the anomaly condition when the type of the anomaly determined by the anomaly type determining portion is of a predetermined anomaly type; and an issuing terminal-notifying portion for notifying the issuing terminal of the anomaly condition when being notified of occurrence of the anomaly condition by the service center-notifying portion.

According to the present invention, in an image processing system including an issuing terminal for issuing entrance permits, a service center and an image forming apparatus connected to the image issuing terminal and the service center, the image forming apparatus detects an anomaly condition thereof and if the type of the detected anomaly condition is of a predetermined anomaly type, the image forming apparatus informs that it is in the anomaly condition and also notifies the issuing terminal of the anomaly condition. Accordingly, when the image forming apparatus becomes out of order, it is possible to immediately inform the service center (make a so-called service person call). That is, the image forming apparatus determines an anomaly condition and notifies the condition of the anomaly automatically, it is possible to perform proper maintenance and shorten the cessation time of the apparatus, hence increase the working ratio.

Also, according to the present invention, the issuing terminal can issue an entrance permit when it is notified by the issuing terminal notifying portion that the image forming apparatus is in the anomaly condition. Accordingly, it is possible to issue the entrance permit briefly when the service person has arrived on-site, hence it is possible for the service person to start maintenance work for the image forming apparatus promptly.

According to the present invention, the entrance permit is issued with the record of the passage permit information for allowing the service person to pass to the place where the image forming apparatus is installed. Accordingly, the visiting service person is allowed to pass through the necessary route only in the compound to reach the place where the image forming apparatus is installed, it is possible to prevent information leakage.

According to the present invention, the entrance permit has an ID information record for identifying the image forming apparatus, and the image forming apparatus starts maintenance mode when the authenticated entrance permit contains the ID information record for identifying the image forming apparatus in question. Accordingly, it is possible to not only perform authentication using the entrance permit but also starts the maintenance mode promptly.

BRIEF DESCRIPTION OF THE DRAWINGS

FIG. 6 is a chart showing one example of a data structure of trouble log information in the present embodiment;

FIG. 7 is a chart showing one example of a data structure of entrance permit information in the present embodiment;

FIG. 8 is a flow chart showing an operation of an image forming process in the present embodiment; and, FIG. 9 is a flow chart showing an operation of an image forming process in the present embodiment.

DESCRIPTION OF THE PREFERRED EMBODIMENTS

The best mode for carrying out the present invention will hereinafter be described with reference to the accompanying drawings. Here, in the embodiment, an image processing system using a digital multifunctional machine will be described as the image forming apparatus to which the present invention is applied.

[System Scheme]

Figure 1:
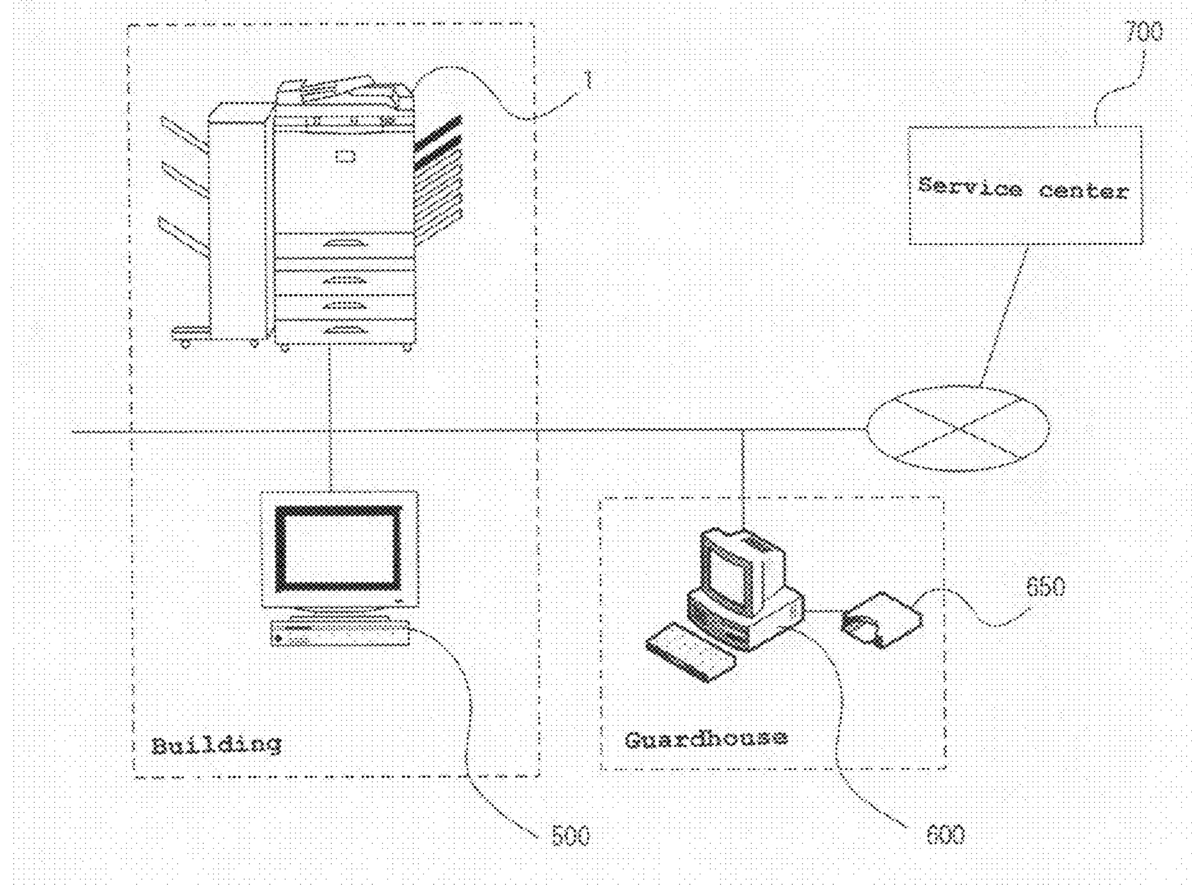
FIG. 1 is a schematic view showing an image processing system in the present embodiment.

FIG. 1 is a diagram for illustrating the scheme of an image processing system. As shown in FIG. 1, a digital multifunctional machine 1 is installed in a building and connected to a management device 500 and a LAN (local area network).

Also, the digital multifunctional machine is connected via the LAN to a computer 600 in a guardhouse so that it can communicate with the guardhouse. Further, computer 600 is connected to an entrance permit issuing device 650 so as to be able to create entrance permits.

Here, the entrance permit is an entity that is used by a visitor (e.g., service person) to enter the compound (building). In this embodiment, this is a card embedded with an IC chip, and entrance permit information is recorded into the IC chip by entrance permit issuing device 650.

The entrance permit entity is not limited to cards using IC chips, but any other form such as a card using an RF tag, a magnetic card, printed 2-dimensional barcode, etc., can be also used.

Digital multifunctional machine 1 is also connected to a service center 700 via a public network or the internet. When trouble occurs in digital multifunctional machine 1, service center 700 arranges and sends a service person.

Figure 2:
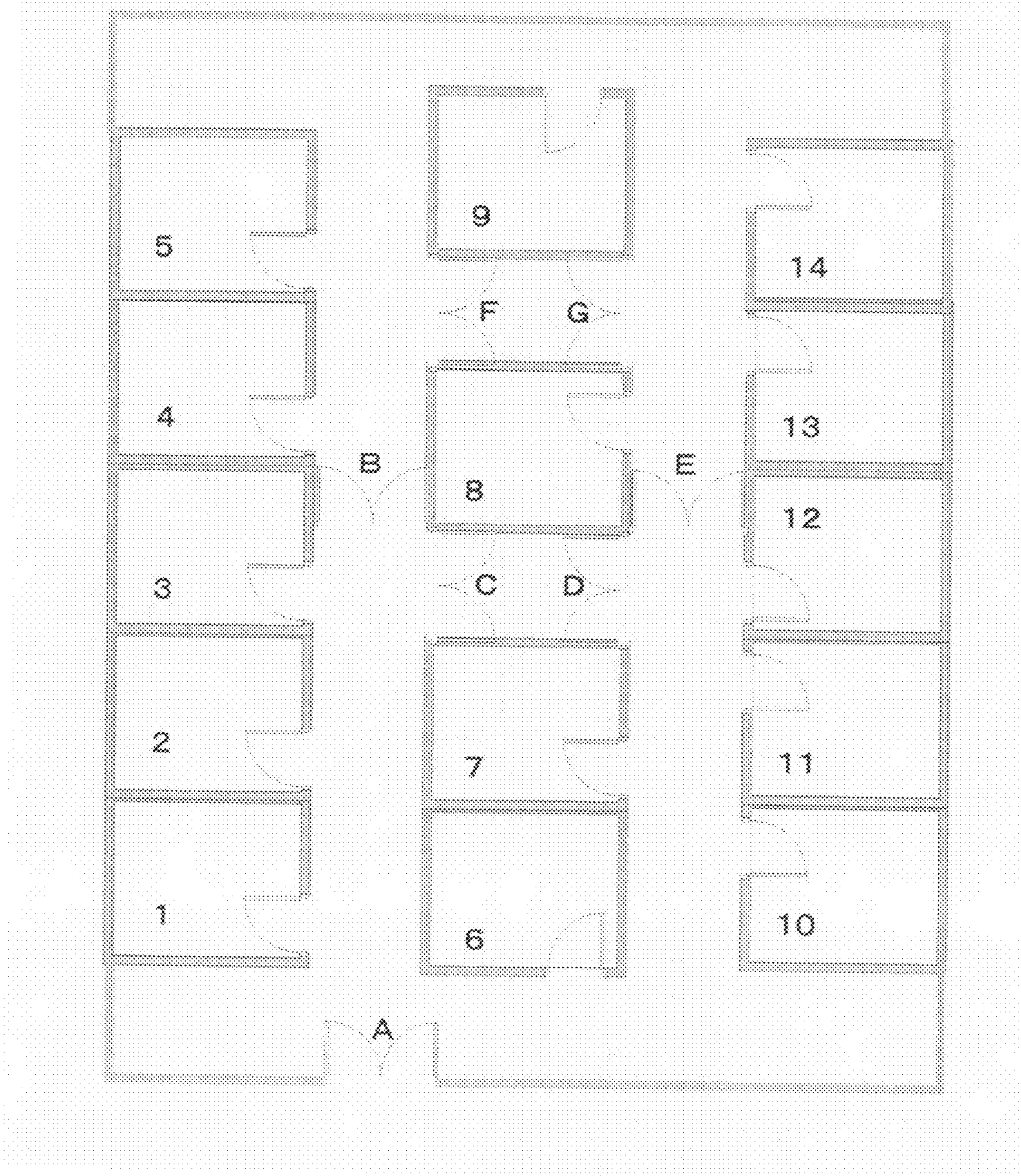
FIG. 2 is a view for illustrating a building in the present embodiment.

Now, one example of a building will be described with reference to FIG. 2. The building in the present embodiment includes a plurality of rooms, these rooms having digital multifunctional machines 1 installed therein. Arranged at the entrance of each room is a passage gate corresponding to the room number. Further, passage gates A to G are arranged at different places in the passages.

When each passage gate detects an entrance permit, it reads out the recorded entrance permit information from the entrance permit. When the readout entrance permit information contains the information that allows its holder to pass through the passage gate in question, it releases the lock at the passage gate.

For example, when the service person holds an entrance permit that allows him/her to pass through passage gates 'A', 'B' and '4', he/she will be able to enter room '4' passing through passage gates 'A' and 'B'.

[Description of Functions of Digital Multifunctional Machine]

Figure 3:
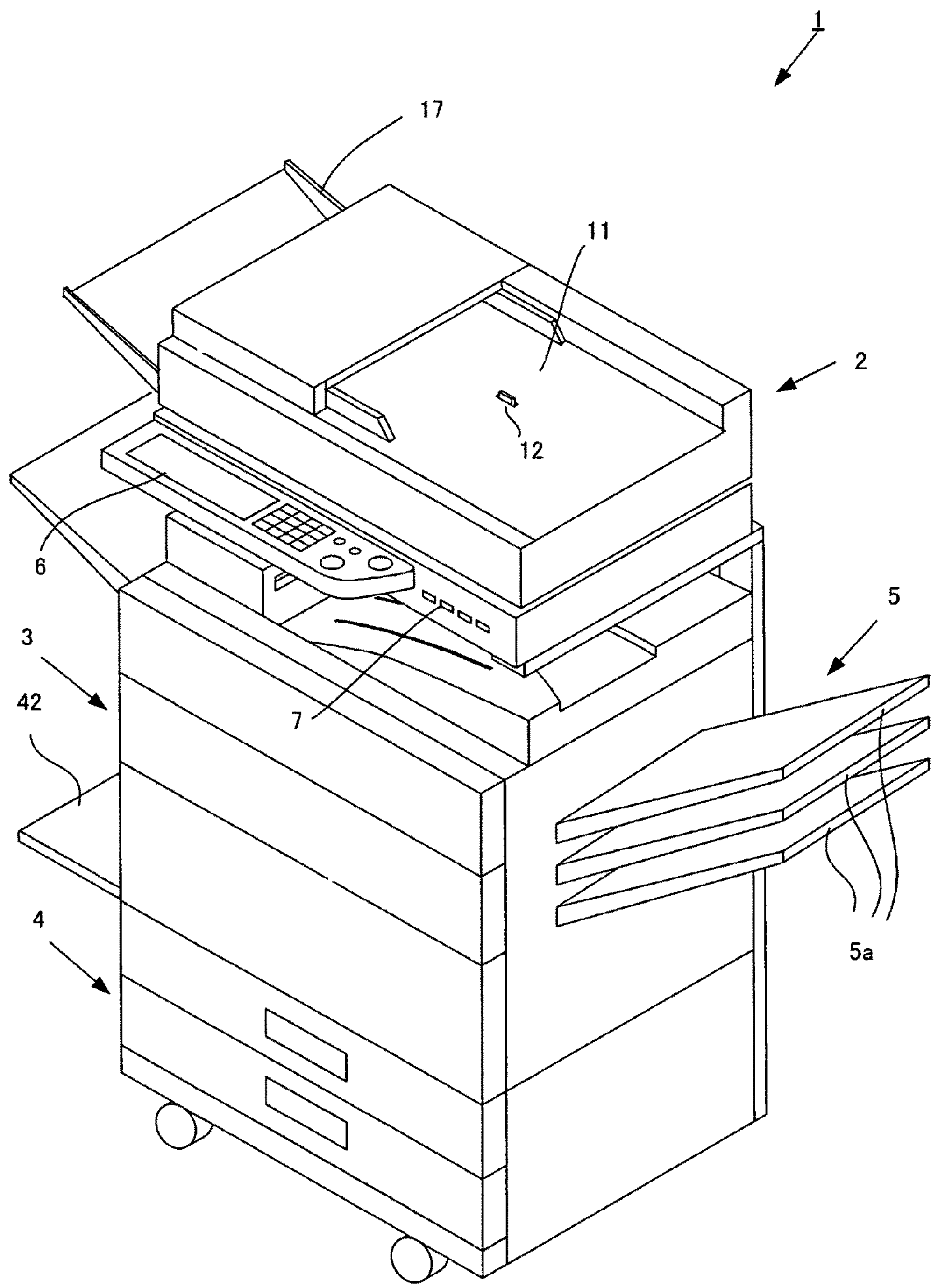
FIG. 3 is an external view showing a digital multifunctional machine in the present embodiment.
Figure 4:
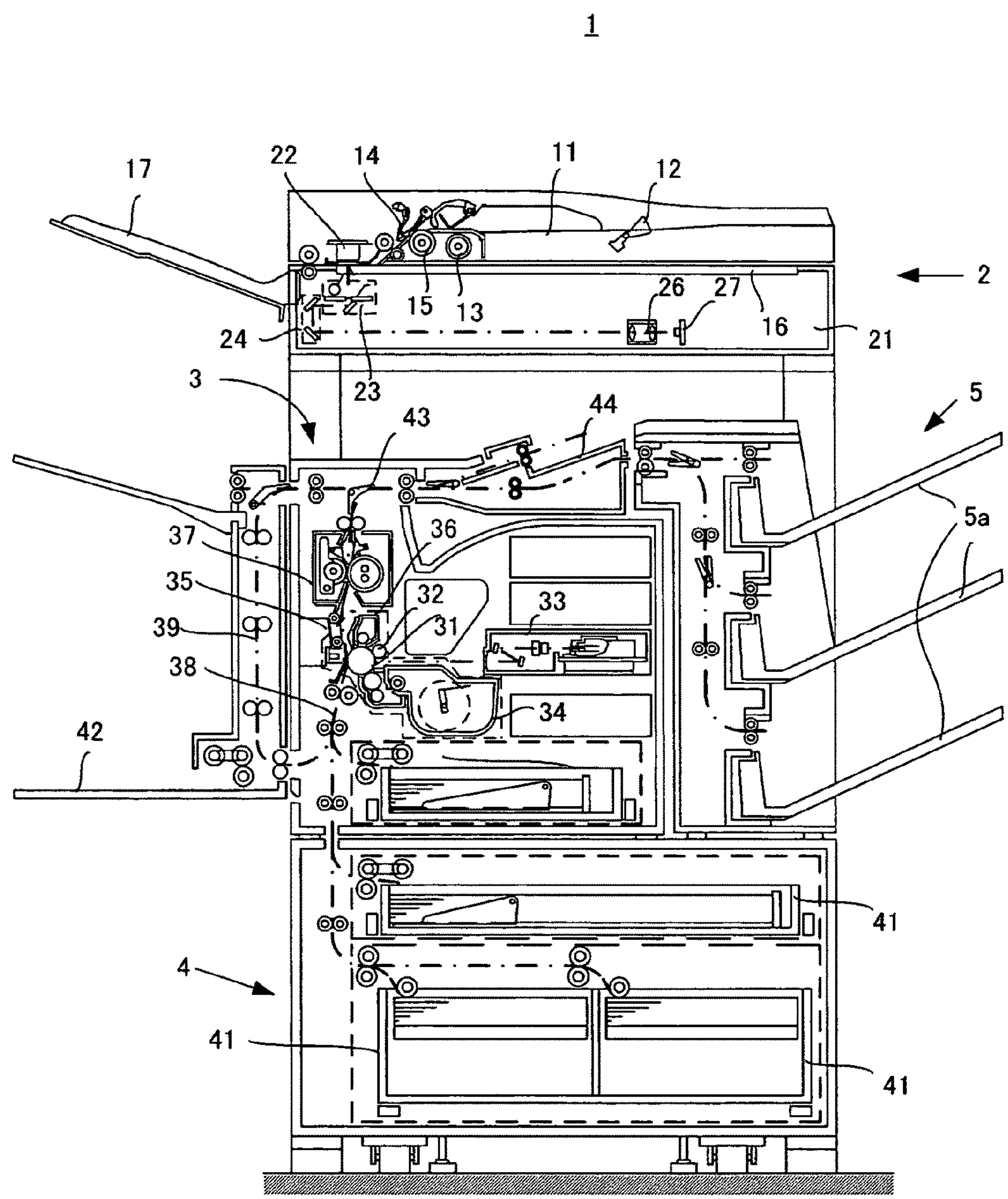
FIG. 4 is a sectional view showing a digital multifunctional machine in the present embodiment.

Next, the functions of digital multifunctional machine 1 will be described. FIGS. 3 and 4 are perspective and sectional views showing one embodied configuration of digital multifunctional machine 1 in the present embodiment. This digital multifunctional machine 1 can be selectively used in copy mode for reading images from originals to print them out on recording sheets, in facsimile mode for reading images from originals to transmit and receiving images of originals to print them out on recording sheets, in printer mode for receiving images from information terminal devices via networks to print them out on recording sheets and in other modes. This digital multifunctional machine 1 essentially includes a document feeding and reading portion 2, an image forming portion 3, a paper feeder 4, a paper discharge processor 5 and a USB interface 7.

Next, the operation of digital multifunctional machine 1 will be described taking an example of the copy mode. To begin with, as documents are set on a document set tray 11 of document feeding and reading portion 2, a document detecting sensor 12 detects the status as documents having been set. Then, a control panel 6 of the document feeding and reading portion 2 is operated so as to input settings of the size of the print paper, magnification ratio, etc. Thereafter, control portion 6 is operated to instruct the start of a copying operation.

In response to the control, document feeding and reading portion 2 pulls out documents, sheet by sheet, by means of a pickup roller 13, from document set tray 11 and delivers the document between a separation plate 14 and a feed roller 15 toward a platen glass 16 so that the document is conveyed in the sub-scan direction over platen glass 16 and discharged to a document output tray 17.

In the above operation, the front side (the lower side) of the document is read by a first reader 21. That is, a first scan unit 23 of first reader 21 is moved and set at a predetermined position while a second scan unit 24 is positioned at a predetermined position. The front surface of the document is illuminated through platen glass 16 by the exposure lamp of first scan unit 23, and the light reflected off the document is lead by the reflection mirrors of first and second scan units 23 and 24 to an image focusing lens 26, which converges the reflected light of the document on a CCD (charge coupled device) 27, forming a focused image of the image of the document surface on CCD 27, thereby reading the image on the document surface.

On the other hand, the reverse face (the upper side) of the document is read by a second reading portion 22. Second reading portion 22 is disposed over platen glass 16, and includes: an exposure lamp (LED (light emitting diode) array, fluorescent lamp or the like) for illuminating the reverse side of the document; and a contact image sensor (CIS) for photoelectrically converting the reflected light of the document, received through a Selfoc lens array that focuses the reflected light from the original, to output analog image signals per pixel.

Also, the document may be placed on platen glass 16 by unfolding the upper body of document feeding and reading portion 2 so that the document surface can be read by means of first reader 21. In this case, first and second scan units 23 and 24 are moved in the sub scan direction keeping a predetermined speed relationship relative to each other while the document on platen glass 16 is illuminated by first scan unit 23, and the light reflected off the document is lead to image focusing lens 26 by means of first and second scan units 23 and 24 so that the image of the document is focused by image focusing lens 26 onto CCD 27.

When one or both sides of the document have been read in the above way, the image data representing one or both sides of the document is input to a controller 100 (shown in FIG. 5) of a microcomputer etc., where the image data undergoes various image processes, and the processed image data is output to image forming portion 3.

Image forming portion 3 prints the document images represented by the image data on recording paper, and includes a photoreceptor drum 31, a charging device 32, a laser scan unit (which will be referred to hereinbelow as LSU) 33, a developing unit 34, a transfer device 35, a cleaning device 36, a charge erasing device (not shown) and a fixing unit 37.

Also, image forming portion 3 is provided with a main feed path 38 and a reverse feed path 39. The recording paper delivered from paper feeder 4 is conveyed along main feed path 38. Paper feeder 4 draws recording paper, sheet by sheet, from a stack of recording paper, held in a paper feed cassette 41 or set on a manual feed tray and delivers the recoding paper to main feed path 38 of image forming portion 3.

In the course of the recording paper being conveyed along main feed path 38 of image forming portion 3, the recording paper passes through and between photoreceptor drum 31 and transfer device 35 and then passes through fixing device 37 to complete printing for the recording paper. While photoreceptor drum 31 rotates in one direction, its surface is cleaned by cleaning device 36 and the charge erasing device, then uniformly electrified by charging device 32. Laser scan unit 33 modulates the laser beam based on the image data from document feeding and reading portion 2 and repeatedly scans the laser beam over the photoreceptor drum 31 surface in the main scan direction, to form an electrostatic latent image on the photoreceptor drum 31 surface. Developing unit 34 supplies toner to the photoreceptor drum 31 surface and develops the electrostatic latent image to form a toner image on the photoreceptor drum 31 surface. Transfer device 35 transfers the toner image on the photoreceptor drum 31 surface to the recording paper which passes through the nip between the transfer device 35 and photoreceptor drum 31. Fixing device 37 heats and presses the recording paper to fix the toner image onto the recording paper.

Arranged at the junction of main feed path 38 and reverse feed path 39 is a branch claw 43. When printing is performed only on one side of recording paper, branch claw 43 is positioned so as to lead the recording paper from fixing device 37 to a paper output tray 44 or paper discharge processor 5.

When printing is performed on both sides of recording paper, branch claw 43 is pivotally moved to the position indicated by the dashed line so as to lead the recording paper to reverse feed path 39. Then, the recording paper passes through reverse feed path 39 and is inverted upside down and fed to main feed path 38 again. Then, the recording paper is once again printed on its reverse side in the course of main feed path 38 and lead to paper output tray 44 or paper discharge processor 5.

The recording paper thus printed is lead to paper output tray 44 or paper discharge processor 5 so that it is discharged to paper output tray 44 or discharged to any one of a plurality of paper output trays 5*a* of paper discharge processor 5.

In paper discharge processor 5, a plurality of recording sheets are sorted and discharged to different output trays 5*a*, and/or each set of recording sheets is punched or stapled. For example, when multiple copies of multiple originals are prepared, recording sheets are sorted and discharged to each paper output tray 5*a* so that each copy of multiple originals is allotted to different paper output tray 5*a*, and each set of recording sheets on paper output tray 5*a* is punched or stabled to prepare a printed matter.

[Configuration of Digital Multifunctional Machine]

Figure 5:
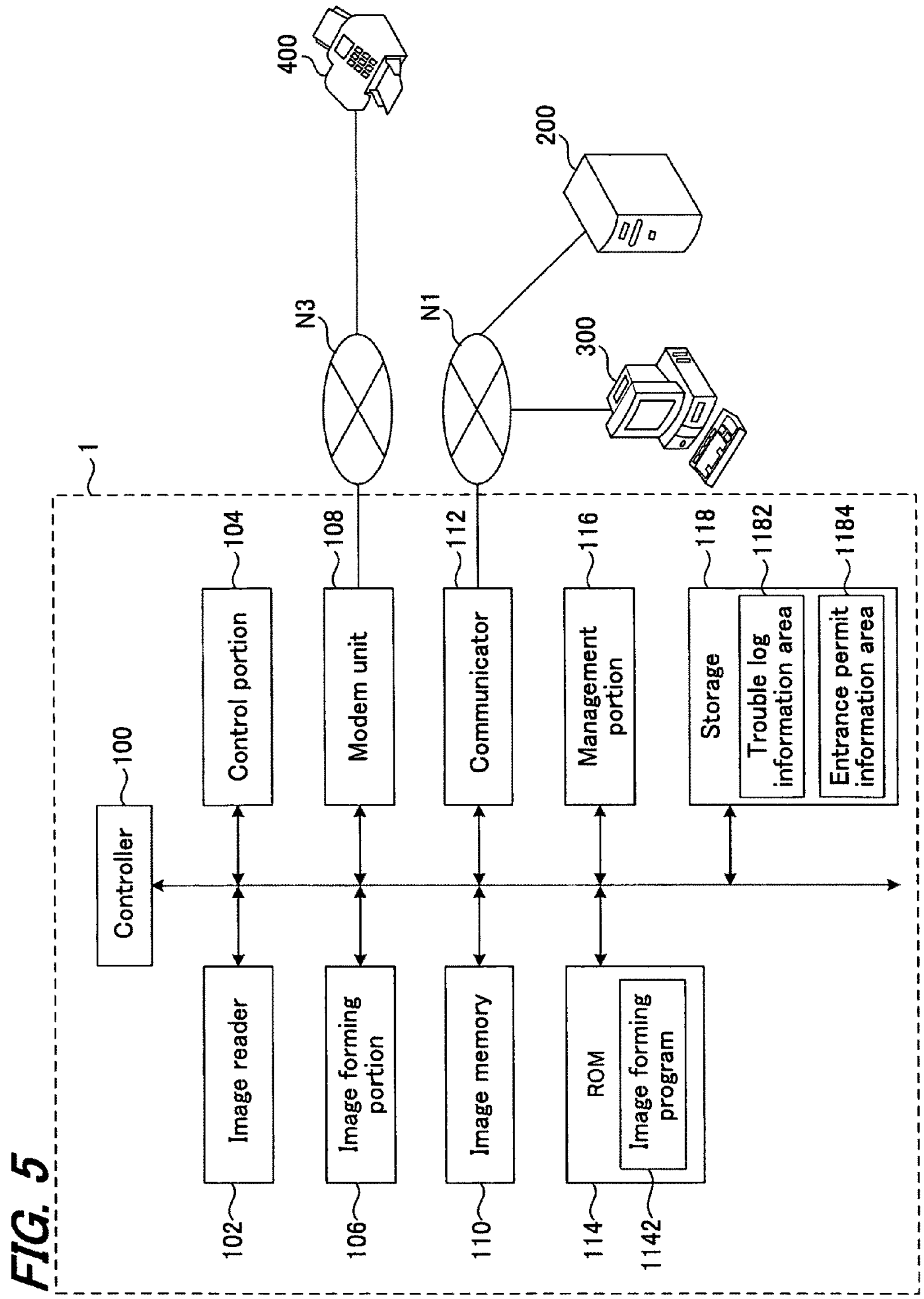
FIG. 5 is a configurational view showing a digital multifunctional machine in the present embodiment.

Next, referring to FIG. 5, the configuration of digital multifunctional machine 1 will be described. As shown in FIG. 5, in digital multifunctional machine 1, controller 100 is connected to an image reader 102, a control portion 104, an image forming portion 106, a modem unit 108, an image memory 110, a communicator 112, a ROM 114, a management portion 116 and a storage 118. Also, modem unit 108 is connected to a public network N3 while communicator 112 is connected to a network N1.

Controller 100 is a functional unit for performing various operations and controls of digital multifunctional machine 1. For example, controller 100 detects an anomaly condition of digital multifunctional machine 1, determines the type of the detected anomaly condition. When the determined type of the anomaly condition is of a predetermined anomaly type, the controller performs such control as to inform the anomaly condition to service center 700 and computer 600 of the guardhouse as shown in FIG. 1.

Controller 100 reads out different programs stored in digital multifunctional machine 1 to execute them to realize various processes. Here, controller 100 is comprised of a CPU (central processing unit) for performing operations.

Image reader 102 is a functional unit that reads images on documents to generate image data. Image reader 102 is comprised of, for example a scanner or the like. Here in digital multifunctional machine 1 shown in FIG. 3, document feeding and reading portion 2 corresponds to this. Image data generated by image reader 102 is sent to image memory 110 and temporarily stored therein.

Control portion 104 is comprised of a display means for displaying the necessary information for control, such as a liquid crystal display panel or the like, and an input means such as a touch panel, ten keys or the like, through which control commands and the like can be input by user operation. Here in digital multifunctional machine 1 shown in FIG. 3, control panel 6 corresponds to this.

Image forming portion 106 is a functional unit for forming images based on the image data stored in image memory 110 to record (print) the images on recording paper. For example, the image forming portion can be constructed of a laser printer etc. In digital multifunctional machine 1 shown in FIG. 3, image forming portion 3 corresponds to this.

Modem unit 108 is a functional unit for performing facsimile communication and is connected to public network N3. Here, image data generated by image reader 102 can be transmitted by facsimile communication to another facsimile machine 400 via public network N3 connected to modem unit 108. Digital multifunctional machine 1 can receive image data transmitted via public network N3 from another facsimile 400, at modem unit 108 and can form images based on the received image data by means of image forming portion 106.

Modem unit 108 is connected to service center 700 shown in FIG. 1 via public network N3.

If a predetermined kind of trouble occurs in digital multifunctional machine 1, controller 100 detects and determines the trouble, and information about the trouble is transmitted as required from modem unit 108 to service center 700 via public network N3, under the control of controller 100.

The information etc., as to the service person, transmitted from service center 700 is also received by modem unit 108 via public network N3.

Image memory 110 is the memory for temporarily storing image data. Specifically, image data generated by image reader 102 is once stored in image memory 110. Here, the image data that was designated to be printed out is output to image forming portion 106, the image data that was designated to be stored is output to storage 118, and the image data that was designated to be transmitted or received by communication is output to modem unit 108 or communicator 112.

Image data received by modem unit 108 or communicator 112 is also temporarily stored in memory 110.

Communicator 112 is a functional unit that enables digital multifunctional machine 1 to transmit and receive data via the network. Communicator 112 can be connected to communication network N1, such as an in-house LAN etc., to which a server 200 and one or multiple personal computers (PCs) 300 are connected.

Specifically, digital multifunctional machine 1 transmits the image data generated by image reader 102 from communicator 112 to PC 300. The way the machine is used enables digital multifunctional machine 1 to function as a scanner. Conversely, PC 300 transmits image data to digital multifunctional machine 1. Digital multifunctional machine 1 can form images by means of image forming portion 106 based on the image data received by communicator 112. In this case, digital multifunctional machine 1 can operate as a printer.

Here, communication network N1 can also be connected to a wide area communication network such as the internet etc. In the description of the present embodiment, server 200 and PC 300 are assumed to be connected to network N1, but these may also be connected to a wide area communication network.

Though detailed later, in the present embodiment, communicator 112 is connected to computer 600 located at the guardhouse via communication network N1.

If a predetermined kind of trouble occurs in digital multifunctional machine 1, controller 100 detects and determines the trouble, and the information about the trouble is transmitted as required from communicator 112 to computer 600 at the guardhouse via communication network N1, under the control of controller 100.

The entrance permit information from digital multifunctional machine 1 is also transmitted to computer 600 via communicator 112 and communication network N1. Computer 600, having received the entrance permit information, creates an entrance permit relating to the trouble by recording the entrance permit information into the entrance permit using entrance permit issuing device 650 that is connected thereto.

Figure 9:
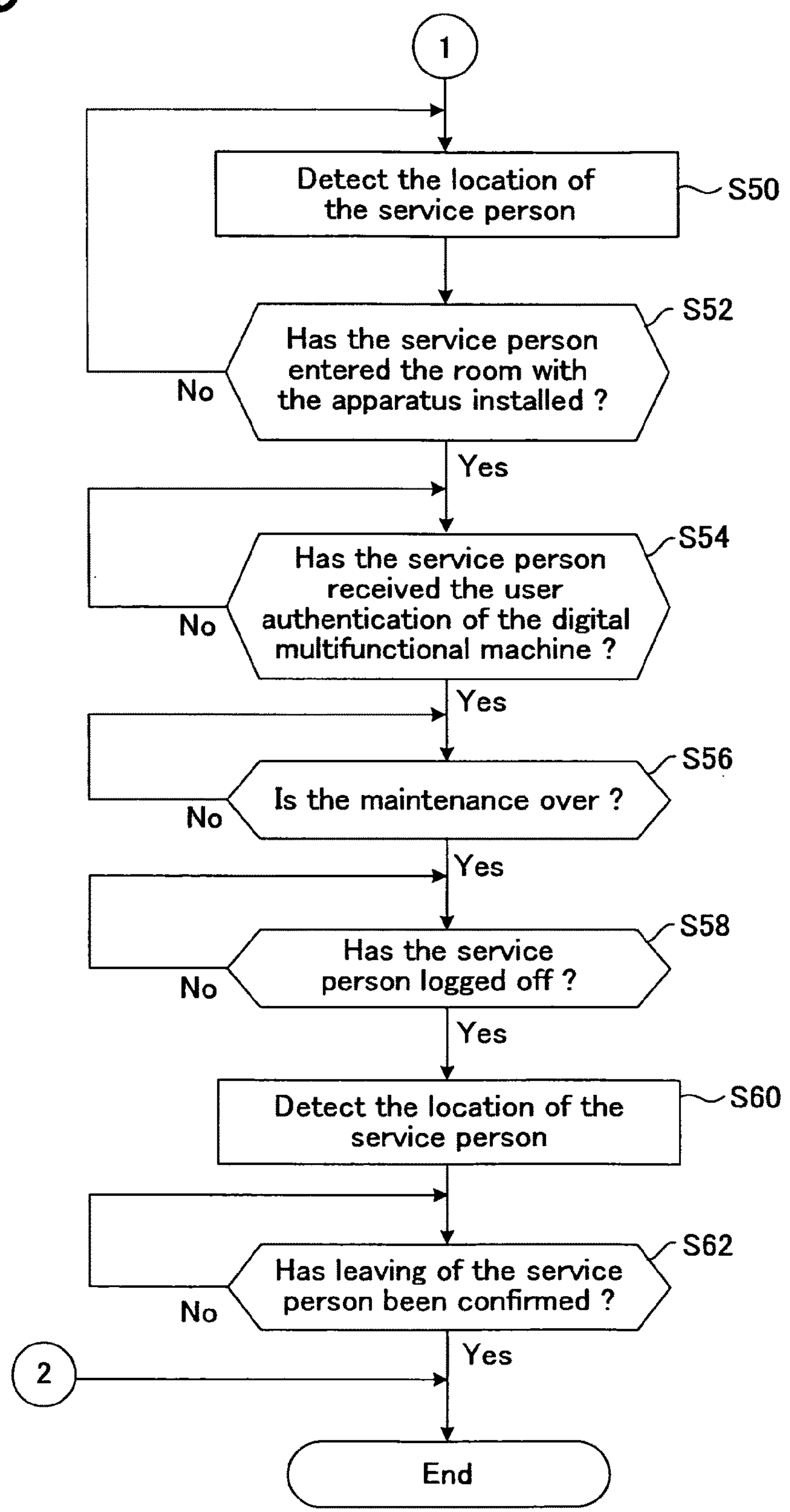

ROM 114 is a functional unit for storing various kinds of data, programs and the like for operating digital multifunctional machine 1. Controller 100 reads out and executes the control program stored in ROM 114 to perform control processing. ROM 114 also stores an image forming program 1142. Controller 100 reads out and executes the image forming program 1142 to realize an image forming process (FIGS. 8 and 9).

Management portion 116 is a functional unit for managing information when digital multifunctional machine 1 executes various processes. Management portion 116, for example, manages various types of information in different kinds of processing in digital multifunctional machine 1, such as managing sequential number information when sequential number information is used in the printing process, for instance.

Storage 118 is a functional unit for storing the settings of digital multifunctional machine 1 and storing the image data that is temporarily stored in image memory 110. Here, storage 118 may be configured of, for example a semiconductor memory, hard disk drive, optical disk drive or any other storage device. Additionally, storage 118 includes a trouble log information area 1182 for storing trouble log information and an entrance permit information area 1184 for storing entrance permit information.

Trouble log information area 1182 is the area for storing trouble log information as a record when anomaly occurred in digital multifunctional machine 1. Here, one example of the trouble log information stored in trouble information area 1182 is shown in FIG. 6. As shown in FIG. 6, trouble log information is composed of the date and time of occurrence of a trouble (e.g., 2007/09/30 12:34:53) and the type of the trouble (e.g., "toner end").

Entrance permit information area 1184 is the area for storing entrance permit information when an entrance permit needs to be created by computer 600 installed at the guardhouse. The entrance permit information includes, as shown in FIG. 7, entrance permit ID (e.g., "A001") and the passage gates (e.g., "A-B-F-G-14") in the building the visitor is permitted to pass through with the entrance permit.

Further, entrance permit information area 1184 stores the person in charge (e.g., "Mr. A") and the date and time of the work (e.g., "2007/09/30 19:00") based on the information (maintenance information) received from service center 700.

[Processing Flow]

Referring next to FIGS. 8 and 9, the operation of digital multifunctional machine 1 in the present invention will be described. FIGS. 8 and 9 show the operation flow of the image forming process executed by digital multifunctional machine 1. This image forming process is a process realized by controller 100 executing image forming program 1142.

To begin with, digital multifunctional machine 1 executes an image forming process (Step S10). If a trouble occurs during this process (Step S12; Yes), the date and time of occurrence of the trouble and the trouble type are recorded in trouble log information 1182 (Step S14).

If no trouble has occurred (Step S12: No), it is determined whether the image forming process is completed (Step S30). Here, the image forming process is continued (Step S30; No), the operation returns to Step S10 and the operation is continued. On the other hand, when the image forming process is ended (Step S30; Yes), the current operation is ended.

Returning to the description for the case of a trouble having occurred, controller 100 records the type of the trouble into trouble log information area 1182, then determines whether the trouble occurring needs maintenance by a service person (Step S16).

Here, as a method for determining whether the trouble occurring needs maintenance by a service person at Step S16, error levels for individual errors may be memorized in storage 118 or trouble log information area 1182. For example, the errors, such as paper jamming and toner end, the user can deal with and the errors, such as abnormal temperature in the fixing unit and CCD malfunction, the user cannot deal with may be classified as different levels of errors, and controller 100 determines whether the error in question needs maintenance (repair) by a service person, depending on the type of the error occurring.

When it was determined at Step S16 that the trouble does not need maintenance by a service person (Step S16; No), controller 100 indicates the maintenance information on control panel 6 (FIG. 3) or the like (Step S32). When this trouble is solved (Step S34; Yes), the operation from Step S10 will be repeated.

On the other hand, when it was determined at Step 16 that the trouble needs maintenance by a service person (Step S16; Yes), controller 100 reports the trouble (trouble log information) to service center 700 by way of public network N3 that is connected to modem unit 108 (Step S18). Controller 100 also notifies the guardhouse of the trouble (Step S20). Specifically, controller 100 outputs to computer 600 at the guardhouse the data on an entrance permit ID to be created as the information as to the occurrence of the trouble.

Subsequently, controller 100 creates entrance permit information in correspondence with the entrance permit ID by adding the data as to the passage gates that the user are permitted to pass through to go to the place where the digital multifunctional machine 1 is installed (Step S22).

Here, if new information associated with the trouble is given, for example, maintenance information is given from service center 700 (Step S24; Yes), controller 100 updates the entrance permit information (Step S26). In the present embodiment, the maintenance information received from service center 700 may include the name of the person in charge, i.e., the service person who visits, and the date and time of the work, and based on the maintenance information, the entrance permit information will be updated.

Next, controller 100 determines whether the service person has received the entrance permit (Step S28). Specifically, when an entrance permit needs to be issued, computer 600 at the guardhouse receives entrance permit information from digital multifunction machine 1. Then, computer 600, based on the received entrance permit information, issues the entrance permit from entrance permit issuing device 650. Accordingly, controller 100 can determine whether the service person has received the entrance permit based on the fact that entrance permit issuing device 650 issued the entrance permit. Here, the entrance permit in the present embodiment is embedded with an IC chip, in which entrance permit information is recorded.

Subsequently, controller 100 detects that the service person has received the entrance permit (Step S28; Yes), and detects where the service person is (at Step S50 in FIG. 9). It is possible to locate the service person by detecting the passage gates the service person has passed through.

Then, when controller 100 detects that the service person has entered the room where the digital multifunctional machine 1 in trouble is installed (Step S52; Yes) and detects that the service person has received the user authentication of digital multifunctional machine 1 (Step S54; Yes), the controller changes the operation of digital multifunctional machine 1 into the maintenance mode for the designated service person to repair it.

Here, as the method by which digital multifunctional machine 1 performs user authentication, digital multifunctional machine 1 may check the entrance permit, for example. That is, the information recorded in the entrance permit is verified based on the entrance permit information stored in entrance permit information area 1184 of digital multifunctional machine 1 to thereby perform user authentication.

When maintenance is over (Step S56; Yes), controller 100 determines whether the service person has logged off the maintenance mode (Step S58). Here, when the service person has logged off the maintenance mode, controller 100 transfers the operation of digital multifunctional machine 1 into usual operation mode so that the digital multifunctional machine 1 can be used by users.

Then, controller 100 detects the location of the service person (Step S60) and confirms that the service person has left the building or compound, the image forming process is ended (Step S62; Yes).

[Operation Example]

Now, the operation from when the service person visits the company until he/she leaves will be described using the drawings. First, when the service person visits the company, an entrance permit is created at the guardhouse. That is, when "A001" is entered as an entrance permit ID at computer 600, the entrance permit information corresponding to "A001" is received from digital multifunctional machine 1.

Then, the received entrance permit information is written by entrance permit issuing device 650 into the IC chip embedded in the entrance permit so as to create the entrance permit.

The service person passes through the passage gates using the entrance permit. Here, entrance permit "A001" is permitted to pass the passage gates 'A', 'B', 'F' 'G' and '14' as shown in FIG. 7. Accordingly, the service person passes through the permitted passage gates and enters the room '14' in FIG. 2.

When digital multifunctional machine 1 detects that the service person has entered the room '14', it changes its operational mode into the maintenance mode. The service person logs in via its maintenance mode and starts maintenance.

Here, when maintenance was over and a log-out process from the maintenance mode is done, the operational mode of digital multifunctional machine 1 transfers to the image forming mode. Then, the service person passes through the permitted passage gates similarly to his/her visit to the company and leaves the company.

[Variational Example]

Though the present embodiment was described using a digital multifunctional machine as an example of an image forming apparatus, the apparatus to which the present invention is applicable is not limited to the above-described machine. Specifically, the present invention can be applied to, for example, a facsimile machine or a computer system including a processor and a printer. It goes without saying that the present invention can be also applied to apparatus of the same kind.

Also, in the description of the present embodiment, digital multifunctional machine 1 is connected to service center 700 via modem unit 108 using a public network, but it goes without saying that the digital multifunctional machine can be connected via communicator 112 using the internet.

Also, in digital multifunctional machine 1, the portion connected to service center 700 may be arbitrary selected so as to be changeable.

Further, in the description of the present embodiment, digital multifunctional machine 1 authenticates the service person by verifying the information recorded in the entrance permit based on the entrance permit information recorded in entrance permit information area 1184. However, authentication of the service person may be performed by, for example, recording the identification number (ID) of digital multifunctional machine 1 in the entrance permit and using this identification number (ID). In this case, when recognising the entrance permit, digital multifunctional machine 1 may and should determine whether the digital multifunctional machine's ID number recorded in the entrance permit corresponds to the ID number of digital multifunctional machine 1.

Further, it is also possible to limit the range in which maintenance can be done, depending on the service person recorded in the entrance permit.

Though in the description of the present embodiment, management of the service person and error management are made in digital multifunctional machine 1, the management may be performed by management device 500 (FIG. 1) in the building. In this case, a plurality of digital multifunctional machines inside the building can be integrally managed by management device 500. This will be described specifically as follows.

In FIG. 1, when the service person receives issue of an entrance permit from entrance permit issuing device 650 that is connected to computer 600, computer 600 transmits the information as to the issue of the entrance permit to management device 500.

Subsequently, when the service person passes through a passage gate in the building, the passage gate transmits the entrance permit ID of the service person who has passed therethrough and the time of passage to management device 500. When the service person gives back the entrance permit at the guardhouse when leaving the compound, the fact of the service person leaving is transmitted to management device 500.

In the above way, management device 500 receives the information as to the location of the service person so as to record where the service person was in the building and how long he/she stayed and other movements. Accordingly, it is possible for the manager to monitor the location of the service person by means of management device 500, hence control the actions of the service person.

What is claimed is:

1. An image processing system including an issuing terminal for issuing entrance permits, a service center and an image forming apparatus connected to the image issuing terminal and the service center, characterized in that the image forming apparatus includes:

- an anomaly status detector for detecting an anomaly condition of the image forming apparatus;
- an anomaly type determining portion for determining the type of the anomaly condition detected by the anomaly status detector;
- a service center-notifying portion for notifying the service center of the anomaly condition when the type of the anomaly determined by the anomaly type determining portion is of a predetermined anomaly type; and,
- an issuing terminal-notifying portion for notifying the issuing terminal of the anomaly condition when being notified of occurrence of the anomaly condition by the service center-notifying portion.

2. The image processing system according to claim 1, wherein the issuing terminal includes an entrance permit issuing portion for issuing an entrance permit when being notified by the issuing terminal notifying portion that the image forming apparatus is in the anomaly condition.

3. The image processing system according to claim 2, wherein the issuing terminal-notifying portion notifies the passage permit information for permitting passage to the place where the image forming apparatus is installed in addition to the anomaly condition; and the entrance permit issuing portion records the passage permit information that the issuing terminal notifying portion has notified of to issue the entrance permit.

4. The image processing system according to claim 1, wherein the service center transmits maintenance information to the image forming apparatus when the service center has received a notice that the image forming apparatus is in the anomaly condition.

5. The image processing system according to claim 4, wherein the location detector also detects the time when the location of the service person is detected.

6. The image processing system according to claim 1, being connected to a management device for managing a service person, wherein the management device includes a location detector for detecting the location of the service person.

7. The image processing system according to claim 1, wherein an identification information to identify the image forming apparatus is recorded in the entrance permit, the image forming apparatus includes an entrance permit recognition portion for recognising the entrance permit, and moves into a maintenance mode when identification information is recorded in the entrance permit recognised by the entrance permit recognition portion.

8. An image processing apparatus connected to an issuing terminal for issuing entrance permits and to a service center, comprising:

an anomaly status detector for detecting an anomaly condition of the image forming apparatus;

an anomaly type determining portion for determining the type of the anomaly condition detected by the anomaly status detector;

a service center-notifying portion for notifying the service center of the anomaly condition when the type of the anomaly determined by the anomaly type determining portion is of a predetermined anomaly type; and an issuing terminal-notifying portion for notifying the issuing terminal of the anomaly condition when being notified of occurrence of the anomaly condition by the service center-notifying portion.

* * * * *